United States Patent Office 2,899,846
Patented Aug. 18, 1959

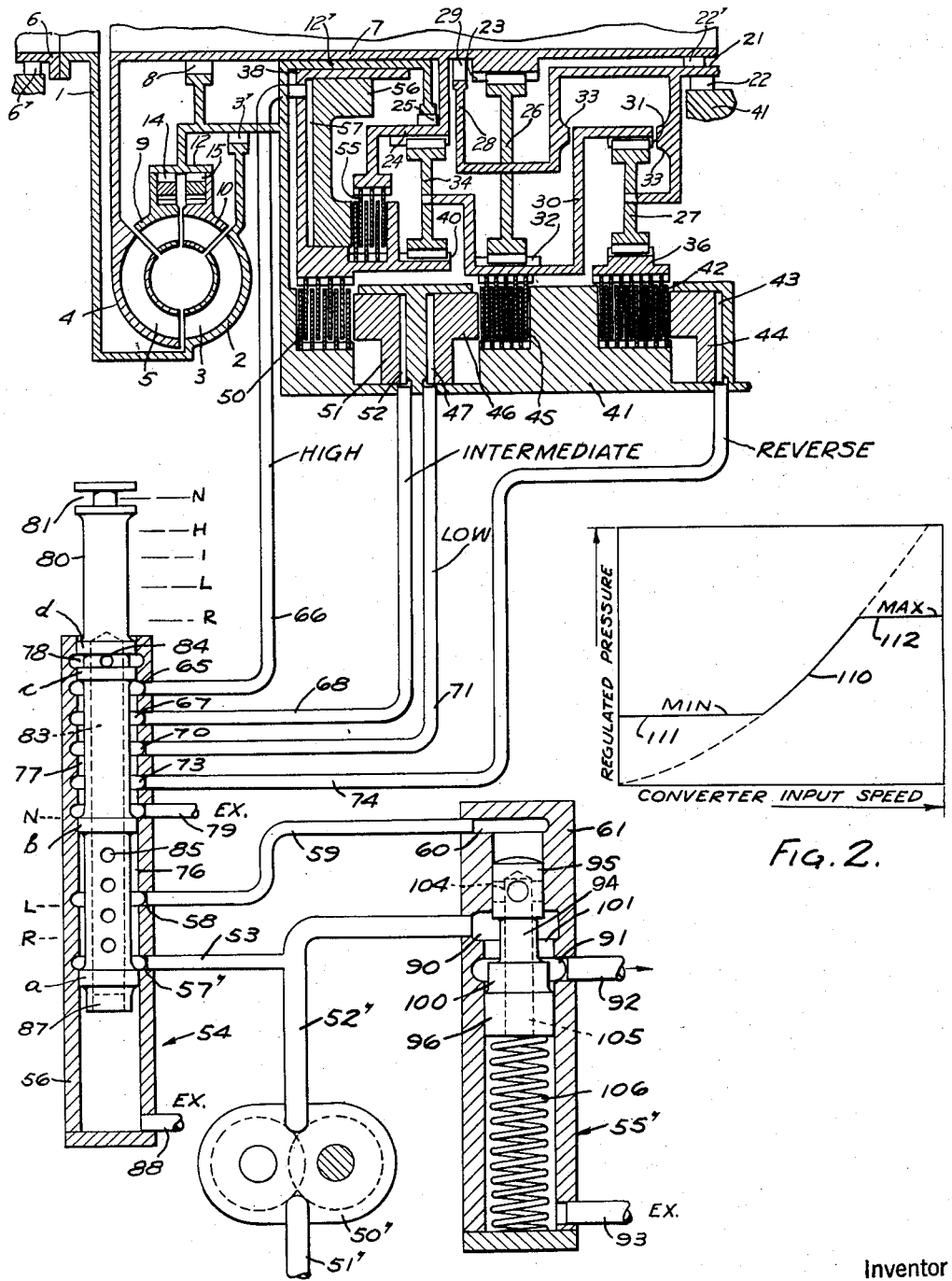

2,899,846

AUTOMATIC TRANSMISSION

Robert M. Tuck, Indianapolis, Ind., assignor to General Motors Corporation, Detroit, Mich., a corporation of Delaware Application August 20, 1954, Serial No. 451,146

13 Claims. (Cl. 74—759)

This is a continuation in part of application Serial Number 289,115, filed May 21, 1952.

This invention relates to automatic transmissions, such as may be employed for the transmission of torque from the engine to the traction wheels or other traction elements of an automotive vehicle, that is, a self-propelled vehicle of any sort, and it has to do particularly with a transmission of the type having frictional engaging elements which are selectively engaged and disengaged for effecting different speed ratios.

In such a transmission the torque output of the hydraulic torque converter varies with the speed of the input member or impeller and, therefore, the speed of the engine since the impeller is connected to the engine.

In order to provide a more efficient and effective use of the torque converter it is combined with a planetary gear set of simplified design providing three forward ratios and reverse. The torque converter output shaft drives the sun gears of both the intermediate and low ratio planetary gear sets. The output shaft is connected to the carrier of the low ratio planetary gear set and the carrier of the reverse planetary gear set. A compound carrier is employed which provides a drive interconnection between all of the planetary gear sets, intermediate, low, and reverse. The compound carrier has planet pinions meshing with the sun gear of the intermediate planetary gear set, a ring gear in the low planetary gear set meshing with the planetary pinions on the output shaft and a sun gear in the reverse planetary gear set meshing with the planet pinions on the output shaft. Direct drive or high ratio is obtained by locking the sun and ring gears of the intermediate gear set. Intermediate ratio is obtained by stopping the ring gear of the intermediate gear set which provides a drive through the intermediate and low planetary gear sets. In low ratio the compound carrier is stopped to stop the ring gear of the low gear set. For reverse the ring gear of the reverse planetary gear set is stopped.

An object of the invention is to provide in a multiple ratio planetary gear unit two planetary gear sets directly driven from the input shaft and an output shaft driven by the carrier of one of said gear sets.

Another object of the invention is to provide in a multiple ratio planetary gear unit having a plurality of planetary gear sets, a unitary carrier member forming a portion of each gear set.

Another object of the invention is to provide in a multiple ratio planetary gear unit having a plurality of planetary gear sets, a unitary carrier member forming a portion of each gear set which is entirely supported by the contact of the gear members with the other gears of the planetary gear sets.

Another object of the invention is to provide in a multiple ratio planetary gear unit having a plurality of gears sets, an input shaft carrying sun gears for two gear sets, an output shaft carrying planetary pinions for two gear sets and a unitary carrier carrying planetary pinions of one gear set, a ring gear of another gear set and a sun gear of another gear set.

A system construction in accordance with the invention is disclosed in the accompanying drawings:

Fig. 1 is a view with parts shown in section, and illustrating diagrammatically, a transmission and torque converter, illustrating diagrammatically an engine operated pump and showing the hydraulic system and selector and pressure regulator valves.

Fig. 2 is a view illustrating the pressure curve.

The transmission, diagrammatically shown, comprises a power input member 1 which may be a part of the flywheel of an engine which is normally connected by suitable flanges to the crankshaft 6 and is thus supported for rotation by the conventional rear engine bearing 6'. This member has a pump or impeller portion 2 provided with vanes 3. The rear end of the input member 1, the impeller portion 2 may extend inwardly and be rotatably supported by bearing 3' on the portion 12 of the frame. The driven member or turbine 4 has vanes 5, this driven member being connected to a member 7 which may be a shaft or sleeve. In conjunction with the impeller and the turbine are vaned stators 9 and 10, associated with a fixed element 12 as by means of one way drive couplings illustrated at 14 and 15. The shaft 7 is rotatably mounted at the forward end in a bearing 8 mounted in the fixed frame portion 12.

These members cooperate to form the torus chamber of a torque converter in which a suitable liquid, such as an oil is maintained under pressure. Rotation of the impeller 2 causes the oil to impinge upon the blades 5 of the impeller to transmit torque to the member 7, and the function of the stator is to return the oil to the vanes of the impeller and to turn the direction of flow of the oil in such a manner as to convert the torque. Such a torque converter is well known to those versed in the art and needs no further description.

The transmission has a final output member 21 and the various gears of the system and the clutching and braking elements are arranged to change the speed ratio between the member 7 which is the input member of the transmission and the output member 21. The output member or sleeve shaft 21 is rotatably supported by a bearing 22 fixed in the frame 41. The input shaft 7 is rotatably mounted in the sleeve shaft 21 and a non-friction needle bearing 22' may be used between shafts 7 and 21. Secured to the member 7 is a sun gear 23 and a sun gear 24. Shaft 7 and the sun gear 23 may be supported by the fixed sleeve 12' which is part of the frame and a bearing 25 between the sleeve and sun gear 24. The output member 21 is in the form of a carrier for carrying planet gears 26 and 27. The carrier portion of output member 21 has at the forward end a support portion 28 rotatably mounted on the shaft by means of the bearing 29. A second unitary carrier member 30 is provided with a sun gear 31, the teeth of which mesh with the planet gear 27, a ring gear 32 the teeth of which mesh with the teeth of the planet gear 26. The member 30 carries planet gear 34, the teeth of which mesh with sun gear 24 and ring gear 40. The member 30 is entirely supported for rotation on the sun and ring gears and needs no bearings to support it on the frame or shafts. The gears supporting the carrier member 30 may include sun gear 24, ring gear 40, sun gear 23 and planet gears 26 and planet gears 27. The member 30 is positioned against end thrust by integral annular thrust lands 33 or suitable separate thrust washers located on opposite sides of the sun gear 31 and located on the carrier structure mounted on shaft 21. There is a ring gear 36 with which the teeth of the pinion 27 mesh, and a member 30 has an internal ring gear formation 40 with which the teeth of the pinion 34 mesh.

A housing or other fixed part is illustrated at 41 and interassociated between the ring gear 36 and the housing 41 is a friction brake generally illustrated at 42 and shown as comprising alternate brake discs or rings connected respectively to the ring gear and the housing. The housing has a cylinder formation 43 with a piston 44 therein capable of shifting to engage the brake 42. Interassociated between the member 30 and the housing is a friction brake 45, the plates of which are arranged to be engaged by a piston 46 in a cylinder 47. A friction brake 50 is disposed between the member 38 and the housing member 41 and arranged to be engaged by a piston 51 in a cylinder 52. There is also a friction clutch 55 disposed between the sun gear member 24 and the ring gear member 38 and this clutch is arranged to be engaged by a piston 56 in cylinder 57. The brakes 42, 45 and 50 and clutch 55 or ratio change or establishing friction devices are individually engaged to condition the gearing for each drive ratio.

In this diagrammatic view only one planetary gear of each set is shown but it is, of course, understood that several gears are used in each set as is well known to those versed in the art, and all the friction elements are shown to be of the disc type although other types of clutching or braking elements could be used.

When the clutch 55 is engaged the input member 7 and the member 21 are locked together at 1:1 ratio. This is as follows: The clutch 55 locks sun gear 24 to the ring gear element 38 so the pinion 34 does not rotate on its axis and thus the ring gear 32 and sun gear 23 and planet gear 26 rotate together without relative rotation thus driving the member 21.

When the brake 50 is engaged the transmission is in intermediate speed ratio. Engagement of the brake 50 holds the ring gear 40 fixed relative to the housing 41. The rotation of the sun gear 24 causes the pinion 34 to revolve about the ring gear 40 in the same direction but at a lower speed. The differential speeds between sun gear 23 and ring gear 32 causes the pinion 26 to revolve about the sun gear 23 and ring gear 32 thus driving the output member 21.

When the brake 45 is engaged the transmission is in low speed ratio. The ring gear 32 is held stationary and the turning of the sun gear 23 causes pinion 26 to revolve around the ring gear in the same direction but at a lower speed thus carrying the output member 21 with it.

When the brake 42 is engaged the transmission is in reverse. The sun gear 23 transmits a forward torque to member 33 and a reverse torque to members 32 and 30 through planet pinions 26. This reverse torque is transmitted through sun gear 31 and pinions 27 to member 33 and is amplified by these gears. The amplified reverse torque is greater than the forward torque introduced through pinions 26 thus causing member 33 to drive the member 21 in the reverse direction.

A pump 50' driven by the engine has an intake line 51' and a high pressure discharge line 52', a branch 53 of which leads to a selector valve 54. The line 52' also leads to a pressure regulator valve 55'. The body of the selector valve is illustrated at 56 and it has a port 57' for connection to the line 53 and a port 58 for connection to a line 59 which leads to a port 60 in the body 61 of the pressure regulator valve. The selector valve body has a port 65 for a line or conduit 66 leading to the cylinder 57, a port 67 for a line 68 leading to the cylinder 52, a port 70 for a line 71 leading to cylinder 47 and a port 73 for connection to a line 74 which extends to the cylinder 43.

The movable valve member 80 has several lands as shown at $a$, $b$, $c$, and $d$, and the valve member is ensmalled in diameter between the lands $a$ and $b$ to provide a passage or way 76, and it is ensmalled between the lands $b$ and $c$ thus providing a way or passage 77. The valve 80 is also constructed to form a passage 78 between the lands $c$ and $d$. The body has an exhaust 79. The valve is ensmalled from land $d$ to the end where it may be provided with spaced heads to provide a slot or groove 81 for reception of an actuating device.

This valve member 80 is hollow for a part of its length thus providing an internal passage 83 which has a port 84 in communication with the passage 78. The valve member 80 also has one or more ports 85 positioned between the heads $a$ and $b$ thus providing a communication between the passage 76 and the passage 83. The passage 83 is, of course, closed at both ends, at the inner end as by means of a plug 87 or the like and at the outer end by an end wall of passage 83. As shown there are four ports 85 between the heads $a$ and $b$ but the number is not controlling. The valve body has an exhaust 88 for the discharge of oil which may otherwise be trapped therein.

The pressure regulator valve body 61 has a port 90 for connection to the pressure line 52', a port 91 for connection to a discharge line 92 which conveniently may convey liquid to the torque converter to keep it supplied. The body also has an exhaust 93.

Within the body 61 is a movable valve member 94 having a head 95 slidably fitting in a relatively small bore in the body, and a head of larger diameter 96 slidably disposed in a relatively large bore in the body. The valve member 94 also has an intermediate head portion 100, and between the ports 90 and 91 is a passage 101 with which the head 100 cooperates. The head portion 100 may conveniently be termed a throttling portion. The head 95 is provided with one or more ports 104 which communicate with a passage 105 extending axially through the valve member 94 and which thus communicates through the spring chamber portion of the bore in the body 61 and to the exhaust 93. A spring 106 normally holds the movable valve member in its uppermost position in the housing 55'.

In the operation of the mechanism the selector valve 54 is caused to be manually shifted. The selector valve member 80 is shown in its uppermost position. Let it be assumed that the engine is operating and the impeller member 2 is rotating. The engine operated pump 50' delivers oil under pressure to the passage 76 of the selector valve. Oil under pressure is also delivered through the line 59 to the pressure regulator valve. For the moment, however, consider the selector valve: It is shown in neutral position and all of the cylinders of the transmission are exhausted through the passage 77 and exhaust 79.

If the selector valve member 80 is shifted from the neutral position shown at N to the high position shown at H, oil under pressure is delivered through line 53, passage 76, port 85 and passage 83, through port 84 and passage 78 and line 66 to the cylinder 57', to engage the clutch 55. If the selector valve member 80 is shifted to the intermediate position shown at I, the passage 78 aligns with port 67 and oil under pressure is delivered to the cylinder 52 for engaging the intermediate brake 50. At this time the cylinder 57 is exhausted or vented through the selector valve by reason of the reduced portion of selector valve member 80 and exhaust 79 for the disengagement of the high clutch 55. If the selector valve member 80 is shifted to the low position, as shown at L, port 78 aligns with passage 70 and oil under pressure is delivered to the cylinder 47 for engaging the low brake 45. The cylinder 52 is now vented for disengagement of the intermediate brake 50.

In this position of the selector valve member 80 the head $b$ lies below, as Fig. 1 is viewed, the port 58 and thus shuts off the delivery of oil under pressure to the pressure regulator valve 61 for purposes which will presently appear. If the selector valve member 80 is shifted to the reverse position as shown at R, the port 78 aligns with port 73 and oil is delivered under pressure to the cylinder 43 to engage the reverse brake 42. The cylinder 47 is vented for disengagement of the low brake 45. The valve is in its lowermost position when in reverse position.

Visualizing a step by step reverse movement of the valve member the clutch and brakes or ratio engaging devices are respectively engaged and released but in reverse sequence. For example, in the low position, the reverse brake cylinder 43 is vented through the exhaust 79, while in the position shown all clutch and brake cylinders are vented through the exhaust 79.

The pressure regulator valve 55' is arranged to provide a pressure curve substantially as indicated in Fig. 2 wherein the curve 110 represents a variation due to orifice effect at different speeds of operation of the impeller and pump. The straight line function for the minimum pressure is indicated at 111 while a straight line function for the maximum pressure is at 112. In the normal at rest position, the regulator valve member 94 is uppermost in the valve body urged in this position by the spring 106. With the engine idling, pressure is delivered through the port 60, and this pressure is effective upon the head 95 of valve member 94 in a direction opposing the spring. Pressure is also delivered through the port 90 and this pressure is additive to the pressure on the head 95 because of the differential area between the land portions 95 and 96. At this time, that is, when the engine is idling, the land 96 closes or substantially closes the exhaust port 91 and the part 100 of smaller diameter lies in the passage 101. Thus, a minimum pressure is maintained as indicated by the straight line 111 of Fig. 2; otherwise the pressure would decrease somewhat as indicated by the lower dotted portion of line 110. At high speeds, as, for example, those speeds attained at full engine throttle, the maximum pressure is indicated at the line 112. The pressures delivered to the regulator valve 55' through ports 60 and 90 overcome the spring and shift it downwardly as Fig. 1 is viewed, thus opening the port 91 widely. The valve provides a gradual increase of pressure with increase of speed as indicated by the curve 110. In this performance the part 100 of smaller diameter is gradually lowered relative to the passage 101 and ultimately when it is substantially withdrawn therefrom the maintained pressure is substantially as indicated by this line 112.

Thus when a ratio engaging device is to be engaged for changing the gear ratio, at relatively low engine speeds, the pressure of the oil introduced into the cylinder for engaging the ratio engaging device is correspondingly relatively low to effect a smooth and gradual ratio engagement. If the speed of the engine is high the pressure is correspondingly higher and, therefore, the ratio engaging device is engaged under higher pressure and in a manner necessary to transmit the available higher torque.

When the selector 54 valve is in the low or reverse positions as above described, oil under pressure is cut off from the port 60 of the regulator valve. This has the effect of reducing the piston area of the pressure control valve member 94 so that the only pressure delivered thereto and acting against the spring 106 is that pressure introduced directly from the pump through port 90. Thus a higher pressure is maintained in the system for actuating the ratio engaging devices when the selector valve is in low or reverse. In this way the ratio engaging devices are engaged in a manner to take care of the high torque reaction in low and reverse.

In the event the hydraulic medium is cold, to the end that it is less fluid than it is in its normal operating condition, the pressure exerted on the regulator valve is higher. This excess of pressure moves the pressure regulator valve member 94 against the spring until the ports 104 register or partly register with the port 90, and thus the oil is discharged through ports 104, passage 105 and exhaust 93. This relieves abnormally high pressures and, of course, will function to relieve high pressures which may be caused not only by cold oil but which may be caused by any other abnormal condition.

I claim:

1. In a multiple ratio transmission, an input shaft, an output shaft, an intermediate ratio planetary gear set, a low ratio planetary gear set, each of said planetary gear sets having a sun gear member, planet gears on a carrier member and a ring gear member, said input shaft being connected to one of said members of said intermediate and low planetary gear sets, said output shaft being connected to a second member of said low planetary gear set, a compound carrier connected to a second member of said intermediate gear set and a third member of said low planetary gear set and holding said carrier connected members in a fixed rotary and axial relationship, said compound carrier and connected members being mounted for rotary and self-centering movement entirely on the gears on the carrier and gears in mesh therewith, and thrust bearing means on one of said shaft axially locating said compound carrier against movement in both directions, means to lock two members of said intermediate planetary gear set together for direct drive, means to stop the third member of said intermediate planetary gear set for intermediate ratio, and means to stop said compound carrier for low ratio.

2. In a multiple ratio transmission, an input shaft, an output shaft, an intermediate ratio planetary gear set, a low ratio planetary gear set, a reverse ratio planetary gear set, each of said planetary gear sets having a sun gear member, planet pinions on a carrier member and a ring gear member, said input shaft being connected to one of said members of said intermediate and low planetary gear sets, said output shaft being connected to a second member of said low planetary gear set and to a member of said reverse planetary gear set, a compound carrier connected to a second member of said intermediate gear set, a third member of said low planetary gear set and to a second member of said reverse planetary gear set to prevent relative rotary and axial movement between the members connected by the compound carrier, said compound carrier and connected members being freely floating for self-centering movement on said gearing during rotary movement, thrust bearing means on one of said shaft engaging said compound carrier to prevent relative axial movement in both directions, means to lock two members of said intermediate planetary gear set together for direct drive, means to stop the third member of said intermediate planetary gear set for intermediate ratio, means to stop said compound carrier for low ratio, and means to stop the third element of said reverse planetary gear set for reverse drive.

3. In a multiple ratio transmission, an input shaft, an output shaft, an intermediate ratio planetary gear set, a low ratio planetary gear set, a reverse ratio planetary gear set, each of said planetary gear sets having a sun gear member, planet pinions on a carrier member and a ring gear member, said input shaft being connected to one of said members of said intermediate and low planetary gear sets, said output shaft being connected to a second member of said low planetary gear set and to a member of said reverse planetary gear set, a compound carrier connected to a second member of said intermediate gear set, a third member of said low planetary gear set and to a second member of said reverse planetary gear set to prevent relative rotary and axial movement between the members connected by the compound carrier, said compound carrier and connected members being freely floating for self-centering movement on said gearing during rotary movement, means to limit axial movement in both directions of said compound carrier mounted on an adjacent pair of said members connected to one of said shafts, means to lock two members of said intermediate planetary gear set together for direct drive, means to stop the third member of said intermediate planetary gear set for intermediate ratio, means to stop said compound carrier for low ratio and means to stop the third element of said reverse planetary gear set for reverse drive.

4. In a multiple ratio transmission, an input shaft, a first sun gear and a second sun gear fixed on said input shaft, an output shaft, a first carrier having pinions mounted on said output shaft, a second carrier on said output shaft having pinions meshing with said second sun gear, a compound carrier element having a first portion having planet pinions meshing with said first sun gear, a second portion having a ring gear meshing with said pinions on said second carrier and third portion having a sun gear meshing with said pinions on said first carrier to completely support said compound carrier element by contact of said meshing gears, said compound carrier element securing said portions together against relative rotary and axial movement, thrust bearing means on one of said shafts engaging one of said portions of said compound carrier to hold said compound carrier against axial movement in both directions, a first ring gear meshing with said pinions on said compound carrier, a second ring gear meshing with and completely supported on said pinions on said first carrier, means to rotatably lock said first sun gear and said first ring gear for unitary rotation to provide a direct drive, means to stop said first ring gear to provide an intermediate ratio, means to stop said compound carrier to provide a low ratio, and means to lock said second ring gear to provide reverse.

5. In a multiple ratio transmission, an input shaft, a first sun gear and a second sun gear fixed on said input shaft, an output shaft, a first carrier having pinions mounted on said output shaft, a second carrier on said output shaft having pinions meshing with said second gun gear, a compound carrier element having planet pinions meshing with said first sun gear, a ring gear meshing with said pinions on said second carrier and a sun gear meshing with said pinions on said first carrier located in a fixed axial relationship, said compound carrier being freely floating and self-centering on said gearing for rotary movement, bearing means on said first and second carriers to limit axial movement of said compound carrier in both directions, a first ring gear meshing with said pinions on said compound carrier, a second ring gear meshing with and entirely supported for self-centering on said pinions on said first carrier, means to rotatably lock said first sun gear and said first ring gear for unitary rotation to provide a direct drive, means to stop said first ring gear to provide an intermediate ratio, means to stop said compound carrier to provide a low ratio and means to lock said second ring gear to provide reverse.

6. In a multiple ratio transmission, an input shaft, a first sun gear and a second sun gear fixed on said input shaft, an output shaft, a first carrier having pinions mounted on said output shaft, a second carrier on said output shaft having pinions meshing with said second sun gear, a compound carrier element having a portion having planet pinions meshing with said first sun gear, a portion having a ring gear meshing with said pinions on said second carrier and a portion having a sun gear meshing with said pinions on said first carrier, said compound carrier being freely floating for self-centering movement on said gearing and for rotary movement, means engaging only one of said portions to limit axial movement in both directions of said compound carrier mounted on said first and second carriers, a first ring gear meshing with said pinions and being freely floating for self-centering movement on said pinions of said compound carrier, a second ring gear meshing with said pinions on said first carrier, means to rotatably lock said first sun gear and said first ring gear for unitary rotation to provide a direct drive, means to stop said first ring gear to provide an intermediate ratio, means to stop said compound carrier to provide a low ratio and means to lock said second ring gear to provide reverse.

7. In a multiple ratio transmission, a housing having a front and rear wall, an input shaft rotatably mounted on said front wall, an output sleeve shaft surrounding said input shaft and rotatably mounted on said rear wall, a first planetary gear set, a second planetary gear set, bearing means between said input and output shafts at said rear wall, bearing means supporting said output shaft on said input shaft between said planetary gear sets, each of said planetary gear sets having a sun gear member, planet gears on a carrier member and a ring gear member, said input shaft being connected to said sun gear member of said first planetary gear set and a first member of said second planetary gear set, said output shaft being connected to a second member of said second planetary gear set, a compound carrier connected to said carrier member of said first planetary gear set and a third member of said second planetary gear set, said compound carrier being entirely supported for rotation and being free for self-centering movement by meshing contact of the gears on the compound carrier meshing with the other gears of each planetary gear set, the ring gear of said first planetary gear set being rotatably mounted on said housing, means to lock two members of said first planetary gear set for one ratio, means to stop the ring gear of said first planetary gear set for another ratio, and means to stop a member of said second planetary gear set for third ratio.

8. In a multiple ratio transmission, a housing having a front and a rear wall, an input shaft, an output sleeve shaft surrounding said input shaft, a first planetary gear set, a second planetary gear set, a third planetary gear set, each of said planetary gear sets having a sun gear member, planet gears on a carrier member and a ring gear member, said input shaft being connected to said sun gear member of said first planetary gear set and a first member of said second planetary gear set, said output shaft being connected to a second member of said second planetary gear set and a first member of said third planetary gear set, a compound carrier connected to said carrier member of said first planetary gear set and a third member of said second planetary gear set and a second member of said third planetary gear set, the third member of said third planetary gear set being a ring gear, said compound carrier being entirely supported by said gears on said compound carrier which mesh with other gears of said planetary gear sets to freely support said compound carrier for self-centering movement, the ring gear of said third planetary gear set being mounted entirely by meshing contact with said planet gears on said carrier, bearing means on said front wall supporting said input shaft located concentrically within said first planetary gear set, means to lock two members of said first planetary gear set for a first ratio, means to stop said ring gear of said first planetary gear set for a second ratio, means to stop a member of said second planetary gear set for a third ratio, and means to stop a member of said third planetary gear set for a fourth ratio.

9. In a multiple ratio transmission, a housing having a front and a rear wall, an input shaft, an output sleeve shaft surrounding said input shaft, first bearing means on said rear wall supporting said output shaft, second bearing means between said input and output shafts supporting said input shaft at said rear wall, a first planetary gear set, a second planetary gear set, a third planetary gear set, each of said planetary gear sets having a sun gear member, planet gears on a carrier member and a ring gear member, said input shaft being connected to a first member of said first planetary gear set and a first member of said second planetary gear set, said output shaft being connected to a second member of said second planetary gear set and a first member of said third planetary gear set, a compound carrier connected to said carrier member of said first planetary gear set and a third member of said second planetary gear set and a second member of said third planetary gear set, the third member of said third planetary gear set being a ring gear, said compound carrier being entirely supported by said gears on said compound carrier which mesh with other gears of said planetary gear sets to freely support said compound carrier for self-centering movement, the ring gear of said third planetary gear set being mounted entirely by meshing contact with said planet gears on said carrier, third bearing means supporting said output shaft on said input shaft between said first and second gear sets, fourth bearing means on said front wall supporting said input shaft concentrically within said first gear set, means to lock two members of said first planetary gear set for a first ratio, means to stop said ring gear of said first planetary gear set for a second ratio, means to stop a member of said second planetary gear set for a third ratio, and means to stop a member of said third planetary gear set for a fourth ratio.

10. In a multiple ratio transmission, an input shaft, an output sleeve shaft surrounding said input shaft, a first planetary gear set, a second planetary gear set, a third planetary gear set, a first bearing means supporting said output shaft on said input shaft between a pair of said planetary gear sets, second bearing means supporting said output shaft on said input shaft rearward of said planetary gear sets, each of said planetary gear sets having a sun gear member, planet gears on a carrier member and a ring gear member, said input shaft being connected to said sun gear member of said first planetary gear set and a first member of said second planetary gear set, said output shaft being connected to a second member of said second planetary gear set and a first member of said third planetary gear set, a compound carrier connected to said carrier member of said first planetary gear set and a third member of said second planetary gear set and a second member of said third planetary gear set, the third member of said third planetary gear set being a ring gear, said compound carrier being entirely supported by said gears on said compound carrier which mesh with other gears of said planetary gear sets to freely support said compound carrier for self-centering movement, and the ring gear of said third planetary gear set being mounted entirely by meshing contact with said planet gears on said carrier.

11. In a planetary gear unit, an input shaft, an output sleeve shaft surrounding said input shaft, a first planetary gear set, a second planetary gear set, a third planetary gear set, a first bearing means supporting said output shaft on said input shaft between a pair of said planetary gear sets, second bearing means supporting said output shaft on said input shaft rearward of said planetary gear sets, each of said planetary gear sets having a sun gear member, planet gears on a carrier member and a ring gear member, said input shaft being connected to a first member of one of said planetary gear sets, said output shaft being connected to a first member of another of said planetary gear sets, a compound carrier connected to said carrier member of said first planetary gear set and a third member of said second planetary gear set and a second member of said third planetary gear set, and the third member of said third planetary gear set being a ring gear.

12. In a multiratio planetary gear transmission, a housing having a front wall and a rear wall having central apertures, an input shaft extending through said apertures in said front and rear walls, bearing means on said front wall supporting said input shaft, a sleeve output shaft extending through said aperture in said rear wall and rotatably supported only by a bearing on said rear wall, a bearing located substantially concentrically with said last named bearing to rotatably support said input shaft within said output shaft, a front sun gear mounted by a hub fixed on said input shaft, a middle sun gear fixed on said input shaft, a support sleeve extending rearwardly from said front wall surrounding said input shaft and having a bearing rotatably supporting said front sun gear, a front ring gear having a hub rotatably supported on said support sleeve, a front carrier having pinions meshing with said front sun and ring gears, means to lock said sun and ring gears together, means to hold said ring gear, a middle carrier connected to said output shaft having pinions meshing with said middle sun gear and supported only by a bearing on said input shaft between said front and rear sun gears and by said output shaft, a middle ring gear mounted on said front carrier meshing with said middle pinions, a rear sun gear mounted on said front carrier, a rear carrier fixed on said output shaft and having pinions meshing with said rear sun gear, a rear ring gear meshing with said rear pinions, means to hold said rear ring gear, said front carrier being supported entirely by the contact of said front pinions with said front sun and ring gears, the contact of said middle ring gear with said middle pinions and said rear sun gear with said rear pinions, means to hold said front carrier.

13. In a multiratio planetary gear transmission, a housing having a front wall and a rear wall having central apertures, an input shaft extending through said apertures in said front and rear walls, a tubular support secured to said front wall surrounding said input shaft and extending forwardly and having bearing means spaced from said front wall supporting said input shaft, a sleeve output shaft extending through said aperture in said rear wall and rotatably supported only by a bearing on said rear wall, a bearing located substantially concentrically with said last named bearing to rotatably support said input shaft within said output shaft, a front sun gear mounted on a hub fixed on said input shaft, a middle sun gear fixed on said input shaft, a support sleeve extending rearwardly from said front wall surrounding said input shaft and having a bearing rotatably supporting said front sun gear, a front ring gear having a hub rotatably supported on said support sleeve, a front carrier having pinions meshing with said front sun and ring gears, means to lock said sun and ring gears together, means to hold said ring gear, a middle carrier connected to said output shaft having pinions meshing with said middle sun gear and supported only by a bearing on said input shaft between said front and rear sun gears and by said output shaft, a middle ring gear mounted on said front carrier meshing with said middle pinions, a rear sun gear mounted on said front carrier, a rear carrier fixed on said output shaft and having pinions meshing with said rear sun gear, a rear ring gear meshing with said rear pinions, means to hold said rear ring gear, said front carrier being supported entirely by the contact of said front pinions with said front sun and ring gears, the contact of said middle ring gear with said middle pinions and the contact of said rear sun gear with said rear pinions, means to hold said front carrier.

References Cited in the file of this patent

UNITED STATES PATENTS

| | | |
|---|---|---|
| 2,135,246 | Yoxall | Nov. 1, 1938 |
| 2,329,724 | Maurer | Sept. 21, 1943 |
| 2,402,248 | Hale | June 18, 1946 |
| 2,469,905 | Tatlow | May 10, 1949 |
| 2,480,212 | Baines | Aug. 30, 1949 |
| 2,505,002 | Orr | Apr. 25, 1950 |
| 2,612,792 | Wilson | Oct. 7, 1952 |
| 2,672,767 | Schneider | Mar. 23, 1954 |

FOREIGN PATENTS

| | | |
|---|---|---|
| 164,042 | Great Britain | June 1, 1921 |